March 2, 1943.  H. O. WILLIAMS ET AL  2,312,458
METHOD OF MAKING DEEP WELL SCREENS
Original Filed Aug. 1, 1938  2 Sheets-Sheet 1

Inventors.
Howard O. Williams.
Albert A. Jens.
By A. A. Whiteley
Attorney.

March 2, 1943.   H. O. WILLIAMS ET AL   2,312,458
METHOD OF MAKING DEEP WELL SCREENS
Original Filed Aug. 1, 1938   2 Sheets-Sheet 2
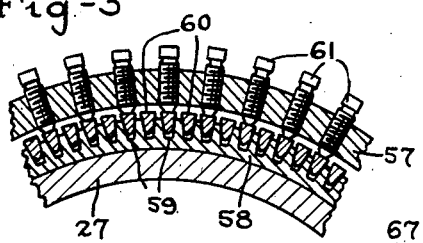
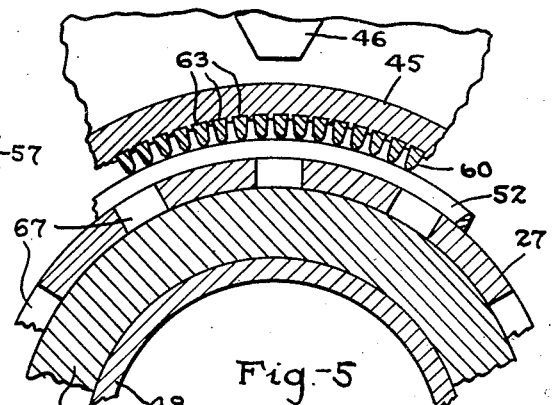
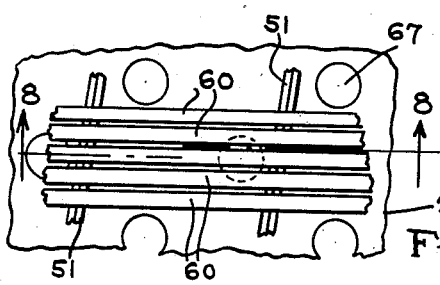
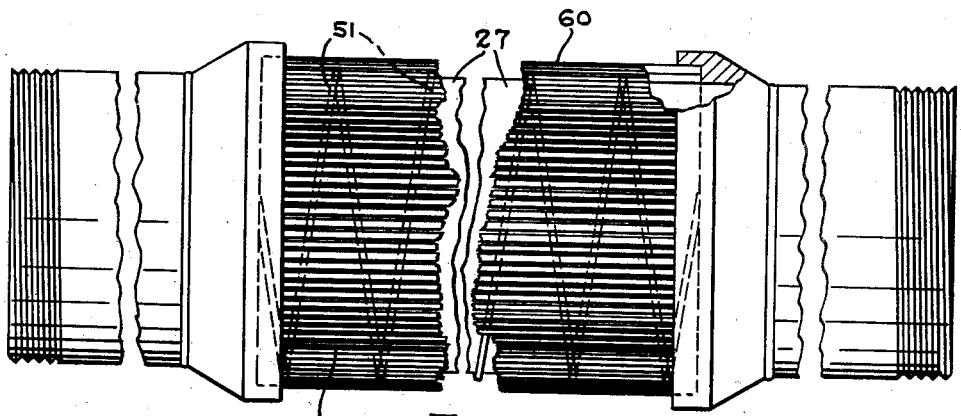
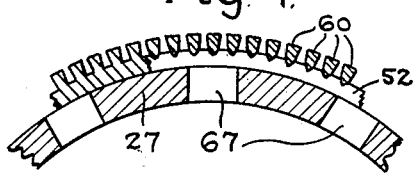
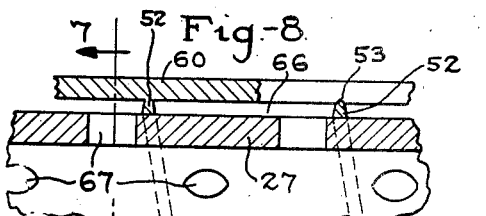
Inventors
Howard O. Williams.
Albert A. Jens.
By
Attorney.

Patented Mar. 2, 1943

2,312,458

UNITED STATES PATENT OFFICE 2,312,458

METHOD OF MAKING DEEP WELL SCREENS

Howard O. Williams, Minneapolis, and Albert A. Jens, St. Paul, Minn., assignors to Edward E. Johnson, Incorporated, St. Paul, Minn.

Original application August 1, 1938, Serial No. 222,410. Divided and this application April 15, 1940, Serial No. 329,749

2 Claims. (Cl. 29—163.5)

Our invention relates to improvements in the method of making deep well screens. It has for its object to provide a method of making a well screen having a perforated pipe base with a supporting wire helically wound about and held in fixed relation upon the pipe base and a screening surface comprising a multiplicity of longitudinal elements spaced to form parallel screen slots and each welded to the helical wire.

It is a principal object of our invention in manufacturing the screen to simultaneously rotate and advance a perforated pipe base and feed thereto a supporting wire so that it will be laid helically upon the pipe base in desired wide spacing of the helical coils thereof and progressively heating the helical wire by desired means as it is laid so that when said helical wire shall contract it will grip the pipe base so as to be immovably united therewith and in effect made integral therewith, and thereafter laying longitudinal elements upon the helical coils of said supporting wire and causing a welding member to traverse the outside of said longitudinal members over the helical coil and thereby weld each of said longitudinal members to the helical coil at each crossing point thereof.

It is a further object of our invention to make a well screen having a perforated pipe base with a supporting wire helically laid upon said pipe base and gripping it so as to be immovably connected therewith and in effect made integral therewith combined with longitudinal screening elements welded to said helical wire at each crossing point thereof and being spaced apart to form longitudinal drainage slots, and forming as an entirety an outer screening envelope comprising a multiplicity of longitudinal screening slots held spaced from and in effect integral with, said pipe base.

This application is a division of our application, Serial No. 222,410, filed August 1, 1938.

The full objects and advantages of our invention will appear in connection with the detailed description thereof and the novel features by which the advantageous results are obtained will be particularly pointed out in the claims.

In the drawings illustrating an application of our invention in one form:

Fig. 3 is a fragmentary sectional view taken on line 3—3 of Fig. 2, which shows how the longitudinal elements are secured to rotate with the pipe base.

Fig. 4 is a fragmentary detail view of a part of a wall of the screen showing how the screening elements are secured to the pipe base.

Fig. 5 is a transverse sectional view on line 5—5 of Fig. 2, showing the manner of holding properly spaced and guiding the longitudinal elements over the helical wire secured to the perforated pipe base.

Fig. 6 is a side elevation view of the screen made in accordance with our invention with some parts broken away.

Fig. 7 is a sectional view through a portion of perforated pipe base helical wire and longitudinal wires showing the manner of uniting the longitudinal strainer elements with the helical wire upon the pipe base, on line 7—7 of Fig. 8.

Fig. 8 is a longitudinal section, partly through one of the longitudinal strainer elements showing their manner of union with the helical wire upon the pipe base, on line 8—8 of Fig. 4.

Figure 1:
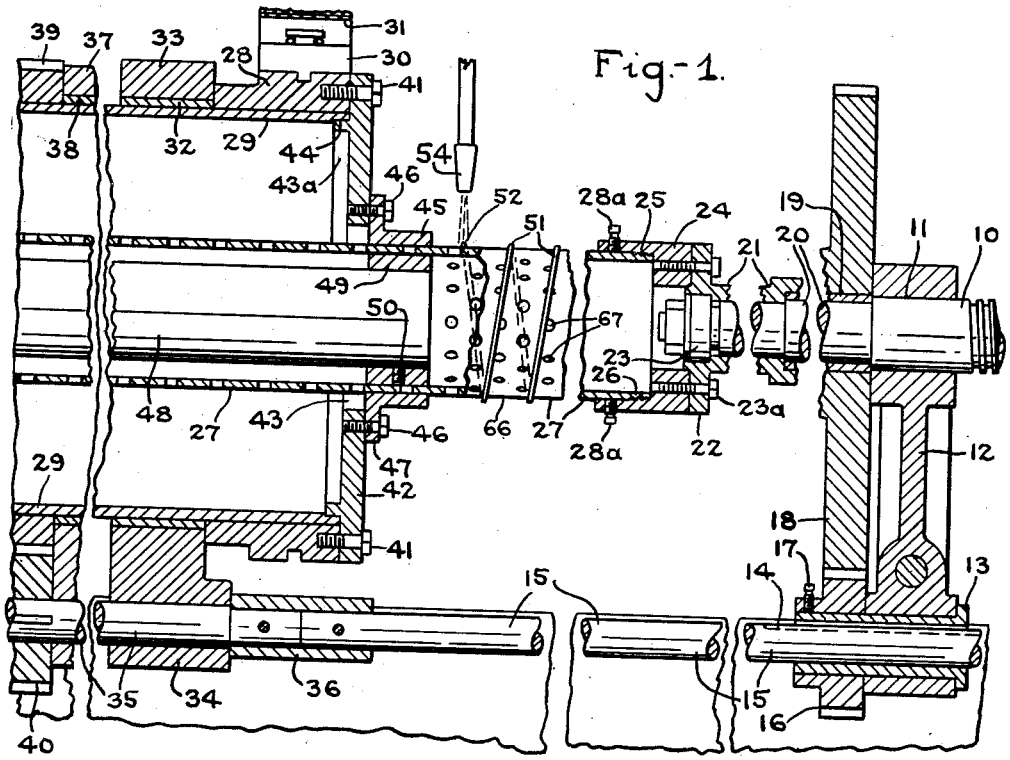
Fig. 1 is a sectional longitudinal view showing the manner of supporting the pipe base for simultaneous advance and rotation and illustrating the manner of heating the wire as it is laid.

As illustrated a lead screw 10 extends through a bearing 11 of a standard 12 which is supported upon a sleeve bearing 13 splined as indicated at 14 to a driven shaft 15. The sleeve bearing 13 has thereon a pinion 16 secured by means of set screw 17 which meshes with a spur gear 18 mounted to rotate independently upon a bearing sleeve 19 surrounding a reduced portion 20 of the lead screw shaft 10. Indicated in broken away sections is an elongated hub 21 formed in conjunction with spur gear 18 which is provided with a head 22. Within head 22 is a thrust bearing 23 by which the pull of the lead screw 10, operated by means not shown, such as are disclosed in Johnson Patent No. 2,046,460, is transmitted to the head 22. Bolted to the head 22 by means of bolts 23a is a cylindrical coupler 24 having an internally threaded cylindrical receiving portion 25 in which is threaded an end 26 of a perforated pipe base 27 of standard construction. The pipe base is further rigidly secured to the coupler 24 by means of a multiplicity of set screws 28a. The coupler 24 shown in Fig. 1 as of a certain size, is interchangeable with other couplers having internally threaded pipe receiving portions of greater or less diameter than that shown in Fig. 1 for connection with pipe bases of greater or less diameter than pipe base 27.

Figure 2:
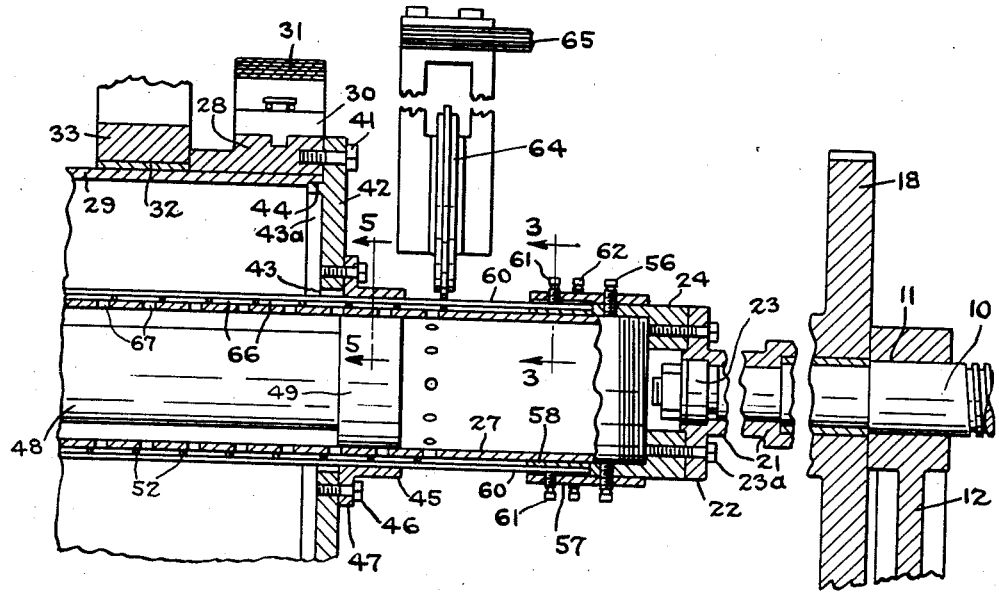
Fig. 2 is a sectional elevation view of parts of the apparatus showing the manner in which the longitudinal wires are secured upon and to rotate with the pipe base and showing the manner in which these elements are welded upon the helical supporting wire.

A heavy contact ring 28 is secured upon an enlarged cylinder drum 29 and cooperates with a shoe 30 which receives electrical current from large volume conductors 31, Fig. 2. The cylinder 29 is adapted to rotate within a bearing sleeve 32 inside of a ring support 33 which has a depending portion 34 supporting a shaft 35 connected at 36 with shaft 15. A second ring support 37 and bearing sleeve 38 are adapted to support the other end of drum cylinder 29 and a spur gear 39 on said drum cylinder meshes with a pinion 40 on shaft 35. The spur gears 18 and 39 and the pinions 16 and 40 respectively are of the same diameter so that the head 22 and pipe base 27 connected therewith have the same rate of rotation as the cylinder drum 29.

To the contact ring 28 is secured by means of bolts 41 a head 42 provided with a central circular opening 43 through which extends the pipe base 27. An inwardly extended flange 43a on head 42 embraces the reduced end of drum 29, as indicated at 44, Figs. 1 and 2. A guide cylinder 45 is adapted to receive within its interior cylindrical surface the outer surface of the pipe base 27 and is secured to head 42 by means of bolts 46 which extend through a flange portion 47 formed integral with guide cylinder 45. A supporting pipe 48 is rigidly attached to a frame portion not shown, and carries a supporting disc 49 pinned thereto by set screw 50 which seats inside the pipe base 27 and forms a support for said pipe base upon which it rotates and over which it is advanced in the operations upon said pipe base. It will be apparent that the head 42, a guide cylinder 45, and guide disc 49 all are interchangeable with other such elements of different diameters to accommodate pipe bases of greater or less diameter than that of pipe base 27 as shown.

In operation, as indicated in Fig. 1, the rotation of pipe base 27 in relation to its rate of advance is such as to lay parallel helical coils 51 of a wire 52, see Figs. 5, 8 and 9 upon the outer cylindrical surface of pipe base 27 as shown in Fig. 1, it being understood that the end of the wire will first be secured in proper position to an end of the cylindrical surface in any well-known way. These coils being spaced apart substantially as indicated to form supports for the screen surface forming elements hereinafter described.

It will be noted that the wrapping wire 52 has the cross sectional shape shown in Fig. 8 wherein the bottom or widest dimension of the wire is laid flat against the outer surface of the pipe base 27 and the walls converge from this bottom and then unite, as indicated at 53, in a substantial edge. As the wire is laid helically upon the outer surface of pipe base 27 it is subjected to a blast of heat, preferably an oxyacetylene flame, as indicated at 54 of Fig. 1. This heat applied directly to the wire as it is laid, progressively heats the wire and extends it back toward the feeding means (not shown) so that continually the wire is elongated as laid through heat expansion. As the helical coils of wire subsequently cool, the contraction will cause them to grip the outer surface of the pipe base with such force as to anchor them immovably upon said pipe base and make them substantially integral with it. It follows that when the entire length of pipe base has been forwarded (and simultaneously rotated) the supporting wire 52 will be laid upon the outer surface of the pipe base in helical coils 51 all of which will be rigidly and immovably held upon the pipe base.

After the helical coils 51 of the supporting wire 52 have been fixed upon the outer surface of pipe base 27, in the manner hereinafter described, a screen surface, such as indicated at 55, is effected in the following manner. To the coupler 24, Fig. 2, is secured by means of set bolts 56 a cylindrical holding member 57 which overlies a ring 58, Fig. 3, formed with a series of open-topped grooves 59 adapted to receive longitudinal surface forming wires 60 of cross sectional shape clearly shown in Figs. 3, 5 and 7. The ends of the wires 60 are laid in these grooves and are firmly held therein by means of rows of set screws 61 and 62. The set screws being staggered to engage alternate wires, as clearly indicated in Figs. 2 and 3. The guide cylinder 45 is formed with a series of rectangular grooves 63, Fig. 5, adapted to receive the flat bottoms of the longitudinal screen wires 60, as shown in Fig. 5 and indicated in Fig. 2, so that as the pipe base 27 is advanced with the wires 60 held thereto these wires will be rigidly held in parallel alinement upon the helical coils 51 of the supporting wire 52, the narrowed edges of screen wires 60 contacting the narrowed edges of supporting wire 52.

After the longitudinal wires have been thus set in position with their narrowed inside edges engaging the helical coils of wire 51 shrunk upon pipe base 27 a welding disc 64 will be caused to track above the helical coils 51 by the means for rotating and advancing the pipe base 27 above described. Current flowing through large volume conductors 65 to the welding disc 64 is caused to pass through longitudinal wire 60 and helically wound wire 51 to the conductors 31, thereby generating sufficient heat to cause welding of the longitudinal element 60 and helical coils 61 at every crossing point thereof, thus uniting together in a single rigid structure the pipe base 27 and the screen surface spaced therefrom by the helical coils 51 rigidly shrunk upon said pipe base 27.

The advantages of my invention which have been clearly indicated in the foregoing description, reside in the fact that the pipe base 27 is bound to the individual helical coils 51 of the wrapping wire by reason of the fact that said wire is heated as wound and the coils in shrinking necessarily grip the wire, becoming practically integral therewith, and the screen surface making rods 60 are then welded to these adherent helical coils overlying the pipe base. The resulting structure is very strong, easily driven, and in a high degree efficient, since the helical channels 66 between wire coils 51 and screen surface formed by longitudinal elements 60 open freely to the perforations 67 through pipe base 27.

We claim:

1. A method of making well screens which consists in providing a perforated pipe base and simultaneously rotating and advancing the same, providing a wire having a flat base and a narrowed edge and securing the end of said wire to the pipe base so the flat base of the wire contacts the pipe base, causing the wire to be fed to said pipe base as it is rotated and advanced so that the base of the wire will be laid helically upon the surface of said pipe base, progressively heating the wire as it is fed, thereafter cooling the wire to cause the same by contraction to grip the pipe base with its flat bases so as to be immovably held thereon and substantially integral therewith, holding on said helix of wire on said pipe base a multiplicity of screen forming elements similar in cross section to the cross section of the wire so that said elements will extend longitudinally in parallel relation with their narrowed edges engaging the narrowed edges of the helical coils and spaced to form longitudinal screening slots, again rotating and advancing the pipe base and screen-forming elements as held, causing a welding disc to travel over the longitudinal elements above said helix of wire, and transmitting a continuous electrical current through said welding disc and helical coil to cause the narrowed edges of the longitudinal elements to be welded to the narrowed edges of the helix of wire at every crossing point thereof.

2. A method of making well screens which consists in providing a perforated pipe base, rotating the same about its central axis and advancing it along said axis at a predetermined rate, causing the end of a wire to be secured to said pipe base and to be fed upon it as it is rotated and advanced so that the wire will be laid helically upon said pipe base, the rate of advancement being such that the helical coils will be spaced apart a substantial distance, progressively heating the wire as it is wound ahead of its points of progressive contacts with the pipe base, the continued advance of the pipe base past the point of heating the wire permitting the previously wound coils thereof to cool to cause the same by contraction to grip the pipe base so as to be immovably held thereon and substantially integral therewith, securing the other end of the wire when so wound to the pipe base, restoring the pipe base with the helical coils thereon to its initial position, holding a multiplicity of strainer elements in contact with and across the outer limits of said helical coils of wire and so that in a plane transverse to the pipe base said elements will be spaced apart at their adjacent edges less than the width of the elements, applying a welding disc to the outer limits of said elements above the first of said helical coils, supplying welding current to said welding disc and through the several elements and coils to ground, and thereafter rotating and advancing the pipe base and the elements thereon at the same rate as when the helical coils were laid on the pipe base to cause the electrode to travel across the outer limits of the strainer elements above said helical coils and to weld the strainer elements in parallel relation with longitudinal drainage slots between all pairs thereof to the helical coils at every crossing point thereof.

HOWARD O. WILLIAMS.
ALBERT A. JENS.